United States Patent [19]

Hain et al.

[11] Patent Number: 4,670,643
[45] Date of Patent: Jun. 2, 1987

[54] DATA SENSING SYSTEM FOR CURRENCY CASSETTES

[75] Inventors: David A. Hain; Edward Husband; Brian Hutchison, all of Dundee, Scotland

[73] Assignee: NCR Corporation, Dayton, Ohio

[21] Appl. No.: 681,171

[22] Filed: Dec. 13, 1984

[30] Foreign Application Priority Data

Oct. 3, 1984 [GB] United Kingdom ............. 8425005

[51] Int. Cl.$^4$ ............................................. G06F 15/30
[52] U.S. Cl. ................................. 235/379; 235/375; 235/449; 235/475
[58] Field of Search ............... 235/379, 475, 479, 480, 235/375, 449

[56] References Cited

U.S. PATENT DOCUMENTS

| | | | |
|---|---|---|---|
| 3,074,353 | 1/1963 | Devonshire et al. | 104/88 |
| 3,227,886 | 1/1966 | Dunigan et al. | 250/223 |
| 3,260,349 | 7/1966 | Vander Meer | 198/38 |
| 3,317,714 | 5/1967 | Hausler et al. | 235/61.11 |
| 3,575,265 | 4/1971 | Simjian | 186/1 |
| 3,643,065 | 2/1972 | Dunigan | 236/61.7 R |
| 3,751,640 | 8/1973 | Daigle et al. | 235/61.11 |
| 3,813,658 | 5/1974 | Rich, Jr. | 340/146.3 K |
| 3,896,293 | 7/1975 | Pass | 235/480 |
| 3,916,157 | 10/1975 | Roulette et al. | 235/61.12 R |
| 3,929,278 | 12/1975 | Balavoine et al. | 235/479 X |
| 4,182,452 | 1/1980 | Hulscher | 209/569 |
| 4,221,376 | 9/1980 | Handen et al. | 271/149 |
| 4,337,393 | 6/1982 | Hilton | 235/487 |
| 4,577,763 | 3/1986 | Placke et al. | 235/379 X |

FOREIGN PATENT DOCUMENTS

| | | |
|---|---|---|
| 0004436 | 3/1979 | European Pat. Off. |
| 1034395 | 6/1966 | United Kingdom . |
| 1313226 | 4/1973 | United Kingdom . |
| 1371005 | 10/1974 | United Kingdom . |
| 1406343 | 9/1975 | United Kingdom . |

Primary Examiner—David L. Trafton
Attorney, Agent, or Firm—Wilbert Hawk, Jr.; Albert L. Sessler, Jr.

[57] ABSTRACT

A currency cassette has removably attached to one side thereof an identification means in the form of a card having a magnetic stripe. Data concerning the cassette, such as the quantity and denomination of the notes stored therein, is recorded on the stripe. Such data is arranged to be read by a read head attached to a carrier which is slidably mounted on support means forming part of a cassette receiving compartment of an ATM into which the cassette is arranged to be inserted. Upon completion of the insertion of the cassette into said compartment, the carrier is arranged to be moved in a controlled manner along said support means by a spring against the action of a dash pot, thereby causing the head to move in a controlled manner along the magnetic stripe and read the data recorded thereon.

11 Claims, 5 Drawing Figures 4,670,643

DATA SENSING SYSTEM FOR CURRENCY CASSETTES

BACKGROUND OF THE INVENTION

This invention relates to the data sensing systems for sensing data relating to currency note containers of the kind used with cash dispensing machines. Such containers will hereinafter be referred to as currency cassettes.

The invention has application, for example, to automated teller machines (ATMs) of the kind wherein a user inserts a customer identifying card into the machine and then enters certain data (such as codes, quantity of currency required or to be paid in, type of transaction, etc.) upon a keyboard associated with the machine. The machine will then process the transaction, update the user's account to reflect the current transaction, dispense cash, when requested, extracted from one or more currency cassettes mounted in the machine, and return the card to the user as part of a routine operation. It is common for an ATM to dispense currency notes of at least two different denominations, in which case the ATM will normally include a separate currency cassette for notes of each particular denomination.

In order to enhance the versatility and flexibility of an ATM, it may be desirable for the or each currency cassette incorporated therein to carry machine-readable identification means for providing information as to the contents of the cassette, such as the quantity and denomination of the notes contained therein.

It is known for a currency cassette to carry on the outside thereof machine-readable identification means in the form of a predetermined array of switch actuating means, such as an array of magnets, the cooperating switch means being disposed on a cassette receiving compartment of a cash dispensing machine in which the cassette is adapted to be inserted. Such known currency cassette identification system has the disadvantage that the array of switch actuating means can store only a limited amount of information.

SUMMRY OF THE INVENTION

The present invention provides a data sensing system for sensing identification data carried by a currency cassette, the system including data storage means having substantial capacity for carrying information as to the contents of the currency cassette, said information being readily changeable.

In accordance with one embodiment of the invention, a data sensing system for a currency cassette comprises, in combination, a currency cassette having machine-readable data storage means carried thereon and cassette receiving means into which said currency cassette is adapted to be inserted, including data reading means movable with said cassette during insertion of said cassette and actuating means operable at the completion of insertion of said cassette for causing movement of said data reading means past said data storage means in a controlled manner following insertion of said cassette into said cassette receiving means for reading data from said data storage means.

It is accordingly an object of the present invention to provide a novel and efficient data sensing system for sensing identification data carried by a currency cassette.

A further object is to provide a data sensing system in which movement of data reading means with respect to data storage means takes place in a controlled manner to effect reading of data from said data storage means.

A further object is to provide a data sensing system in which movement of data reading means with respect to data storage means carried on a currency cassette takes place following an insertion of the currency cassette into a currency cassette receiving means.

With these and other objects, which will become apparent from the following description, in view, the invention includes certain novel features of construction and combinations of parts, a plurality of forms or embodiments of which are herein described with reference to the drawings which accompany and form a part of this specification.

DETAILED DESCRIPTION

Figure 1:
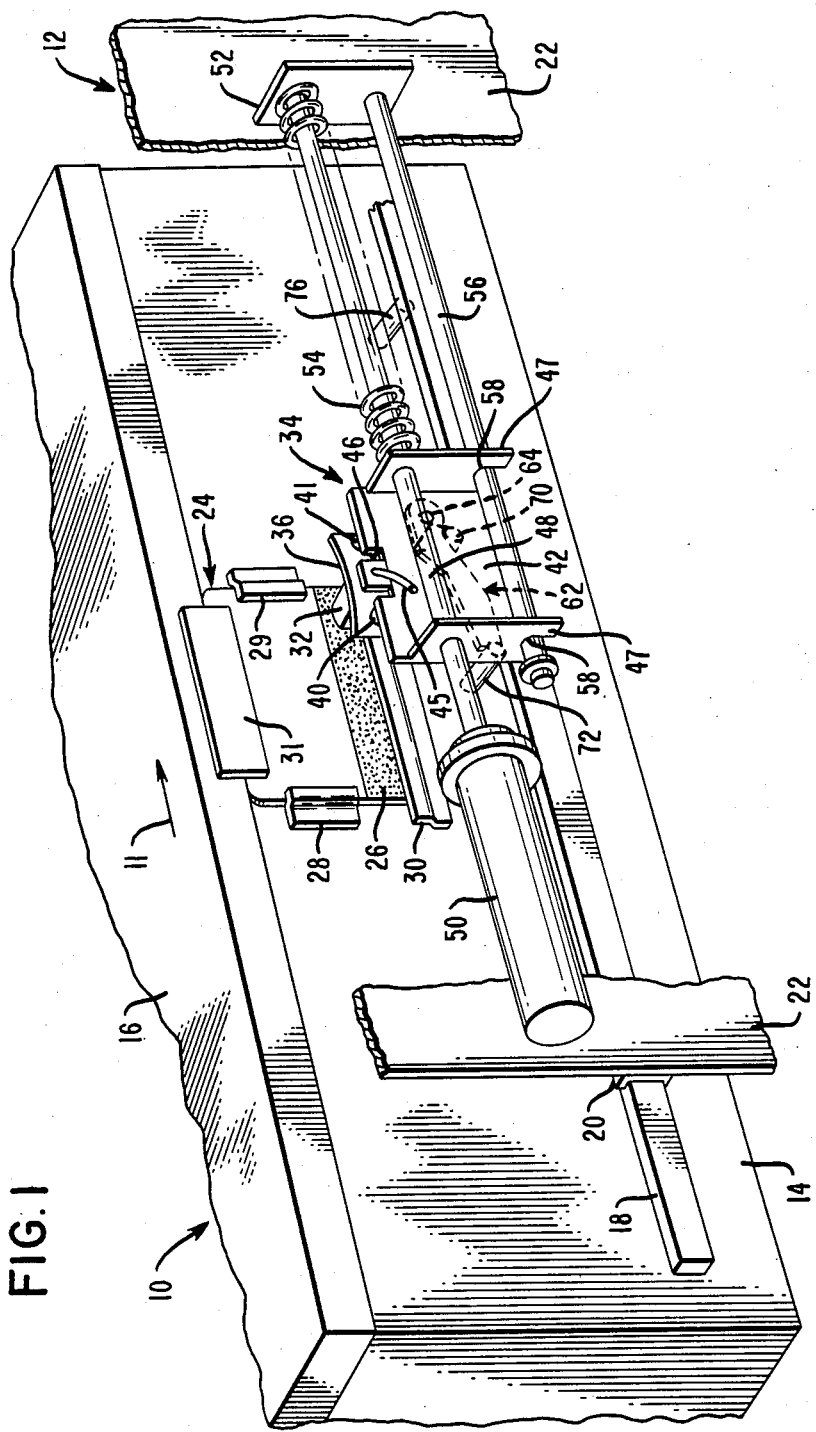
FIG. 1 is a perspective view, shown partly broken away, of a system in accordance with the present invention, the system including a currency cassette shown partially inserted in a cassette receiving compartment of an ATM.

Referring to the drawings, a cassette 10 for currency notes is adapted to be inserted (in the direction indicated by the arrow 11 in FIG. 1) into a compartment 12 formed in the rear of an ATM (not otherwise shown). The cassette 10 comprises a note containin9 receptacle 14 and a lockable lid 16 pivotally connected at one end to the receptacle 14 The ri9ht-hand end (with reference to FIGS. 1 to 3) of the cassette 10 is provided in conventional manner with a door (not shown) which is held in a closed position prior to the cassette 10 being loaded into the ATM, but which is arranged to be opened automatically upon the cassette 10 being inserted into the compartment 12. With the cassette 10 located in a fully inserted position in the compartment 12, notes can be extracted from the receptacle 14 via the open cassette door by means of a pick mechanism (not shown) included in the ATM, for feeding and presentation to a customer.

Figure 2:
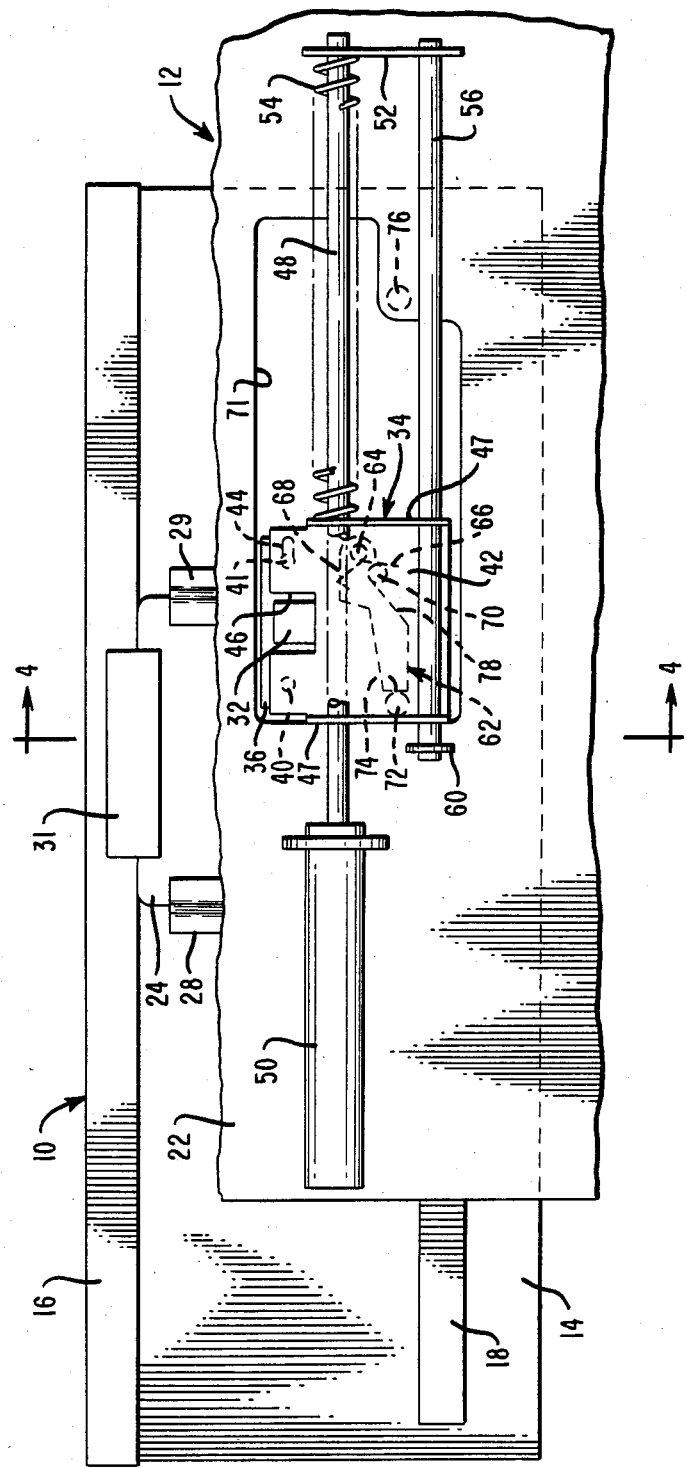
FIG. 2 is a side elevational view of the system shown in FIG. 1, the cassette again being shown in a partially inserted position with respect to the cassette receiving compartment.
Figure 3:
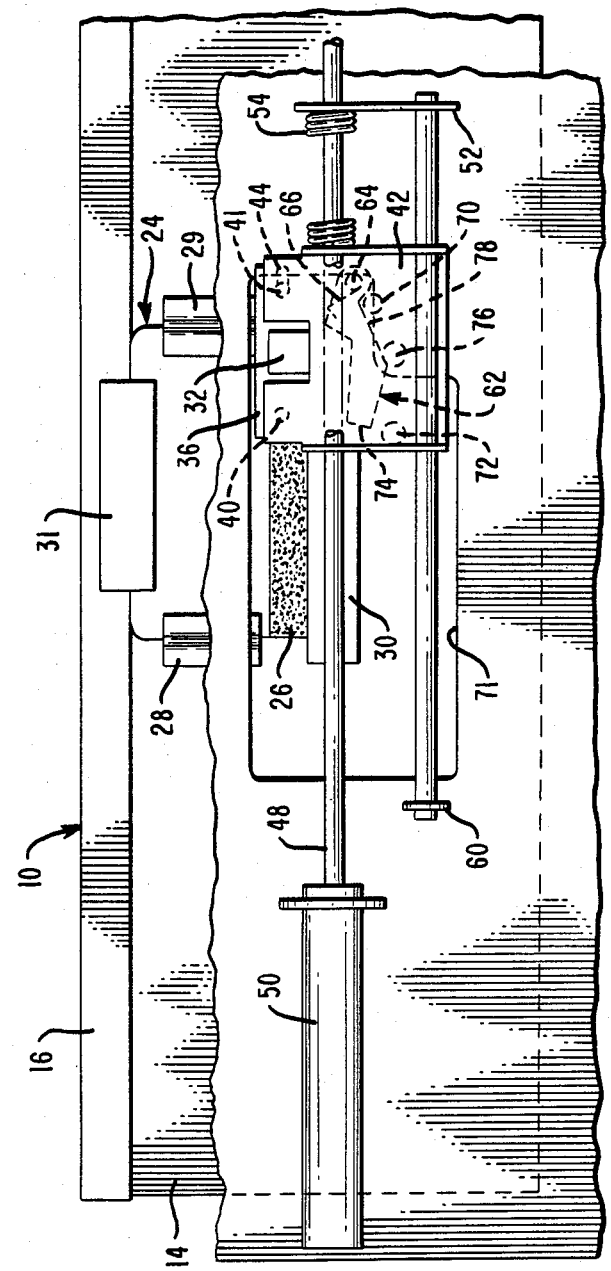
FIG. 3 is a side elevational view similar to FIG. 2 but showing the relationship of the cassette and the cassette receiving compartment when the cassette has just reached its fully inserted position.

The outer surfaces of the side walls of the cassette 10 are respectively provided with two horizontally extending rails 18. The rails 18 are respectively adapted to slidably engage in two horizontally extending guide members 20 of generally U-shaped cross section which are respectively provided on the inner surfaces of two vertical side walls 22, 23 of the compartment 12. During the insertion of the cassette 10 into the compartment 12, the leading ends (right hand ends with reference to FIGS. 1 to 3) of the rails 18 are directed into the guide members 20 and thereafter the cassette 10 is guided into the compartment 12 by virtue of the rails 18 sliding along the guide members 20 until the cassette 10 reaches its fully inserted position as shown in FIG. 3.

The cassette 10 carries on its outside an identification means for providing information concerning the cassette and its contents, such as an identification number for the cassette 10 and the quantity and denomination of the notes contained therein. In the embodiment shown in FIGS. 1 to 4, the identification means is in the form of a standard magnetic card 24 having a magnetic stripe 26 on which is recorded the required information identifying the cassette and its contents. The information is recorded on the stripe 26 using a standard double frequency phase encoding technique. The card 24 is attached by means of four metal tabs 28–31 to the outer surface of a side wall of the cassette 10 with the stripe 26 extending horizontally. The tabs 28–30 are secured to the receptacle 14, with opposed vertical edges of the tabs 28 and 29 respectively overlying the vertical edges of the card 24 and with the upper horizontal edge of the tab 30 overlying the lower horizontal edge of the card 24. The tab 31 is secured to the lid 16, with the lower horizontal edge of the tab 31 overlying the upper horizontal edge of the card 24. If it is desired to replace the card 24 by another card on which is recorded different identifying information, this can be readily done by unlocking the lid 16 and pivoting it into an open position, thereby removing the tab 31 from engagement with the upper edge of the card 24. The card 24 can then be removed by sliding it upwardly out of engagement with the tabs 28–30. Following replacement of the card 24 by another card, the lid 16 is lowered into its closed position and locked, thereby bringing the lower edge of the tab 31 into a position overlying the upper edge of the new card and so retaining the new card in position.

The magnetic stripe 26 is arranged to be read by a conventional magnetic read head 32 such as a Model MSCC read head manufactured by Data Recording Heads Limited of Egham, Surrey, England. The head 32 is mounted on a carrier 34 slidably mounted on the side wall 22 of the compartment 12 in a manner to be described. The head 32 is secured to, and passes through an aperture in, a leaf spring 36. The leaf spring 36 is attached by means of screws 38 (FIG. 4) to two support studs 40 and 41 secured to a central vertical plate 42 of the carrier 34. The shank of that screw 38 which is secured to the stud 41 passes through a slot 44 (FIGS. 2 and 3) in the leaf spring 36 so as to permit a certain amount of flexing of the leaf spring 36 and thereby permit a certain amount of movement of the read head 32 in a direction perpendicular to the main faces of the plate 42. A flexible electrical lead 45 (FIG. 1) for the read head 32 passes through a recess 46 formed in the upper edge of the plate 42 of the carrier 34.

The carrier has a pair of side plates 47 secured to a horizontally extending rod 48 which is connected at one end to the piston (not shown) of a one-way dash pot 50 secure to the outer surface of the side wall 22. That end of the rod 48 remote from the dash pot 50 is slidably mounted in a support bracket 52 projecting from the outer surface of the side wall 22. A compression spring 54 surrounds that part of the rod 48 disposed between the carrier 34 and the bracket 52, the spring 54 bearing against the adjacent side plate 47 of the carrier 34 so as to urge the carrier 34 towards the left with reference to FIGS. 1 to 3. A guide rod 56 is disposed below and parallel to the rod 48, and is a sliding fit in two recesses 58 respectively formed in the lower ends of the side plates 47. One end of the guide rod 56 is secured to the bracket 52 and the other end of the rod 56 is secured to a further support bracket 60 (not shown in FIG. 1) projecting from the outer surface of the side wall 22. Prior to the cassette 10 being inserted into the compartment 12, the carrier 34 is in its left-most position by virtue of being urged by the spring 54 against the bracket 60. As will be explained later, the carrier 34 can be slid along the guide rod 56 away from the bracket 60 against the action of the spring 54.

Figure 4:
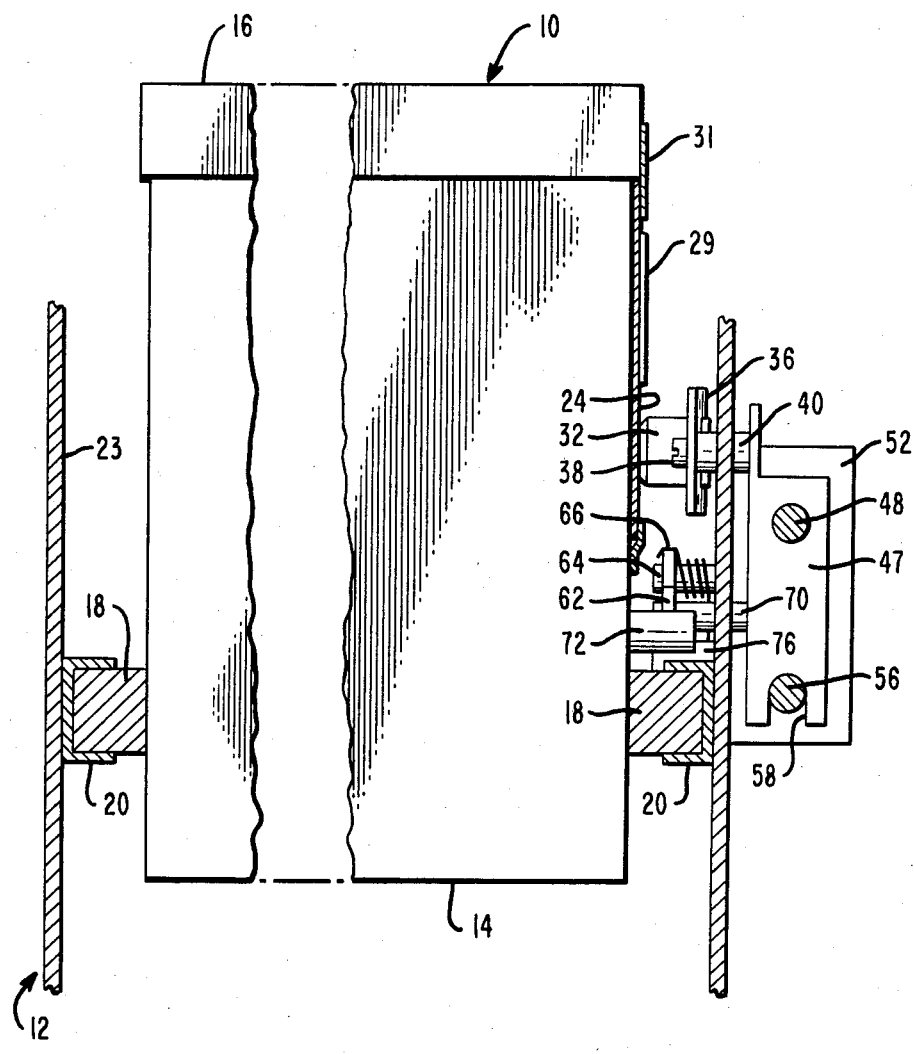
FIG. 4 is a sectional elevational view along the line 4—4 of FIG. 2, with the note containing receptacle and lid of the cassette being shown as an end elevation; ah

A pawl 62 is pivotably mounted on a stud 64 secured to that main face of the central plate 42 of the carrier 34 remote from the rods 48 and 56. The pawl 62 is urged in a counterclockwise direction (with reference to FIGS. 1 to 3) by means of a torsion spring 66 mounted on the stud 64, the ends of the spring 66 respectively bearing against an upper edge 68 of the pawl 62 and against a stop member 70 secured to the plate 42. Prior to the cassette 10 being inserted into the compartment 10, the pawl 62 is urged by the spring 66 into a home position in which it is in engagement with the stop member 70. As seen in FIG. 4, the read head 32 and the pawl 62 are disposed on that side of the wall 22 opposite to the side on which the carrier 34 is disposed. The support studs 40 and 41 for the head 32 and the stud 64 and the stop member 70 for the pawl 62 pass through an elongated opening 71 (FIGS. 2 and 3) formed in the wall 22. For a purpose which will be explained later, a stud 72 secured to and outwardly projecting from a side wall of the cassette 10 is positioned to engage with an end surface 74 of the pawl 62 when the cassette 10 is inserted into the compartment 12, and a stud 76 secured to and inwardly projecting from the side wall 22 of the compartment 12 is positioned to be engaged by a cam surface 78 of the pawl 62 during such insertion.

The mechanical operation of the currency cassette identification system shown in FIGS. 1 to 4 will now be described. As previously mentioned, prior to the cassette 10 being inserted into the compartment 12, the pawl 62 is urged by the spring 66 into its home position in which it is in engagement with the stop member 70, and the carrier 34 is urged by the spring 54 into its left-most position with the carrier 4 bearing against the bracket 60. During an insertion operation, the rails 18 of the cassette 10 slide along the guide members 20 of the compartment, and towards the end of the movement of the cassette 10 into the compartment 12, the stud 72 carried by the cassette 10 comes into engagement with the end surface 74 of the pawl 62. At this point, the leading end of the magnetic stripe 26 (that is to say, the right-hand end with reference to FIGS. 1 and 2) has come into engagement with the read head 32, the head 32 being resiliently urged into contact with the stripe 26 by means of the leaf spring 36. It should be appreciated that, by virtue of the leaf spring mounting arrangement of the read head 32, a certain amount of variation in the spacing between the magnetic card 24 and the side wall 22 of the compartment 12 can be tolerated.

Following the engagement of the pawl 62 by the stud 72, the carrier 34 moves in the direction of the arrow 11, together with the cassette 10, the carrier 34 sliding along the rods 48 and 56 against the action of the spring 54. FIGS. 1 and 2 show the position of the carrier 34 shortly after such engagement. It should be understood that the one-way nature of the dash pot 50 is such that the dash pot does not impede the insertion of the cassette 10 into the compartment 12. The carrier 34 continues to move with the cassette 10, with the pawl 62 in its home position in contact with the stop member 70, until the cam @surface 78 of the pawl 62 comes into engagement with the stud 76 secured to the side wall 22. Thereafter, as the carrier 34 continues to move along the rods 48 and 56, the pawl 62 is caused by the stud 76 to pivot in a clockwise direction until the end surface 74 of the pawl 62 moves out of engagement with the stud 72 as shown in FIG. 3, at which point the cassette 10 has reached its fully-inserted position in the compartment 12. The carrier 34 is then moved by the spring 54 back along the rods 48 and 56 against the action of the dash pot 50, with the lower edge of the pawl 62 riding over the stud 72. The read head 32 is thereby caused to move along the magnetic stripe 26 in a controlled manner from right to left at a substantially constant velocity so as to enable the head 32 to sense the cassette identification data recorded on the stripe 26. Immediately after the read head 32 reaches the left-hand end of the magnetic stripe 26, the carrier 34 reaches its leftmost position, with the left-hand side plate 47 of the carrier 34 bearing against the bracket 60. It should be understood that the data sensing arrangement described above with reference to FIGS. 1 to 4 ensures that the data recorded on the magnetic stripe 26 is always read in a consistent and controlled manner, regardless of the speed with which the cassette 10 is inserted into the compartment 12.

Figure 5:
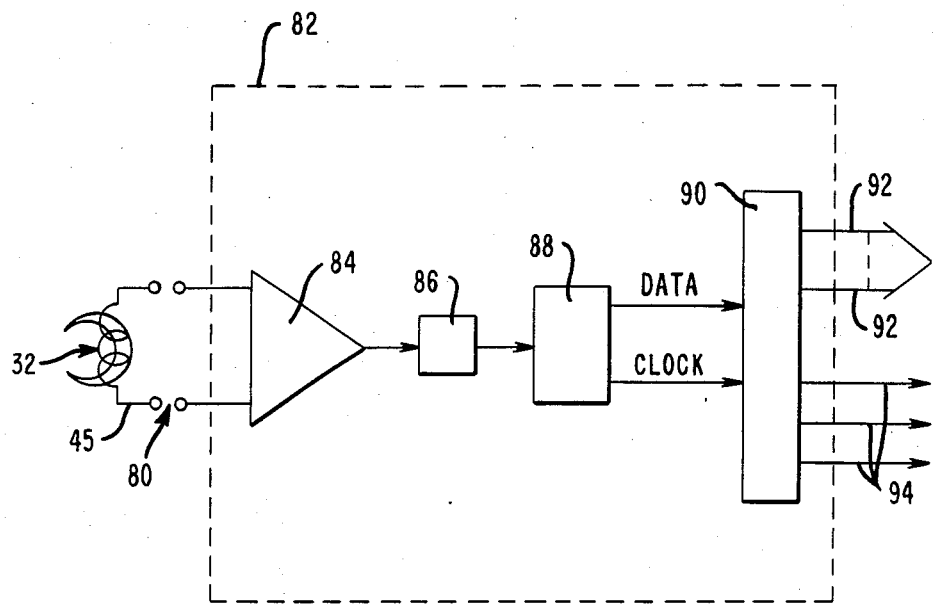
FIG. 5 is a block diagram of a control circuit used with the data sensing system.

Referring now to FIG. 5, the read head 32 is connected via the lead 45 to a connector 80 connecting the lead 45 to a control board 82 of the ATM. The control board 82 includes an amplifier 84 which amplifies the output of the read head 32 and applies it to a squaring and level converter circuit 86. The output of the circuit 86 is applied to a decoder 88 which generates clock and data signals from the incoming signal. The clock and data signals generated by the decoder 88 are respectively applied to the clock and data inputs of a microcontroller 90, such as an Intel 8041 microcontroller. The microcontroller 90 converts the data signals applied thereto into 8-bit data blocks which are sent via data lines 92 to a processing system (not shown) of the ATM along with handshake control signals appearing on output lines 94 of the microcontroller 90. In this manner, the ATM is advised of the identification data carried by the cassette 10, including the denomination and quality of its contents.

The cassette identification system described above with reference to the accompanying drawings has the advantages that a large amount of data can be carried in the magnetic stripe and that this data can be readily changed or updated.

In a modification of the system described above, the magnetic card 24 could be replaced by a card bearing identification data optically recorded in the form of a conventional optical bar code. In such modified system, a bar code read head would be used in place of the magnetic read head 32.

While the forms of the invention shown and described herein are admirably adapted to fulfill the objects primarily stated, it is to be understood that it is not intended to confine the invention to the forms or embodiments disclosed herein, for it is susceptible of embodiment in various other forms within the scope of the appended claims.

We claim:

1. A data sensing system for a currency cassette comprising, in combination:

a currency having machine-readable data storage means carried thereon; and cassette receiving means into which said currency cassette is adapted to be inserted, including data reading means movable with said cassette during insertion of said cassette, and actuating means operable at the completion of insertion of said cassette for causing movement of said data reading means past said data storage means in a controlled manner following insertion of said cassette into said cassette receiving means, for reading data from said data storage means.

2. The data sensin9 means of claim 1, in which said actuating means includes spring means for causing movement of said data reading means in one direction, and damping means for controlling the speed of said data reading means during its spring-driven movement.

3. The data sensing system of claim 2, also including a carrier for said data reading means; fixed support means forming part of said cassette receiving means on which said carrier is slidably mounted so as to be movable relative to said support means in a direction parallel to the direction of insertion of said cassette into said cassette receiving means; pawl means mounted on said carrier; first pawl engaging means carried by said cassette and arranged to engage said pawl means during an insertion of said cassette into said cassette receiving means so as to move said carrier together with said cassette; and second pawl engaging means mounted on said support means and arranged to engage said pawl means as said insertion completed so as to release said carrier for movement in said controlled manner by said spring means in a direction opposite to the direction in which said carrier was moved by said first pawl engaging means, thereby bringing about said relative movement between said data reading means and said data storage means.

4. The data sensing system of claim 3, in which said data reading means is attached to said carrier by resilient mounting means, whereby said data reading means is arranged to bear resiliently against said data storage means during said relative movement therebetween.

5. The data sensing system of claim 3, in which said spring means comprises compression spring means arranged to be compressed during movement of said carrier brought about by said first pawl engaging means.

6. The data sensing system of claim 1 in which said data storage means is in the form of a data carrying card removably attached to the outside of said cassette.

7. The data sensing system of claim 1 in which said data storage means comprises a magnetic coating provided on the outside of said cassette.

8. The data sensing system according to claim 7, in which said magnetic coating is in the form of a magnetic stripe extending parallel to the direction of insertion of said cassette into said cassette receiving means.

9. A data sensing system for sensing data from a currency cassette having machine-readable data storage means carried thereon, comprising, in combination:

currency cassette receiving means;

data reading means for reading data from said machine-readable data storage means;

a carrier for said data reading means;

support means fixed to said currency cassette receiving means for slidably mounting said carrier for linear reciprocating movement in a direction parallel to the direction of insertion of said cassette into said cassette receiving means;

spring means coupled to said carrier to cause movement of said carrier in one direction;

damping means to contorl the extent and speed of said carrier in said one direction;

pawl means mounted on said carrier;

first pawl engaging means carried by said cassette and arranged to engage said pawl means during an insertion of said cassette into said cassette receiving means so as move said carrier together with said cassette in a direction opposite to said one direction; and second pawl engaging means mounted on said support means and arranged to engage and pivot said pawl means ss said insertion is completed so as to move said pawl means out of engagement with said first pawl engaging means and release said carrier for movement in a controlled manner by said spring means in said one direction, thereby bringing about relative movement between said data reading means and said data storage means for the sensing of data therefrom.

10. The data sensing system of claim 9 in which the damping means is a dash pot.

11. The data sensing system of claim 9, in which said spring means comprises compression spring means arranged to be compressed during movement of carrier brought about by said first pawl engaging means.

* * * * *

UNITED STATES PATENT AND TRADEMARK OFFICE
CERTIFICATE OF CORRECTION

PATENT NO.  : 4,670,643
DATED       : June 2, 1987
INVENTOR(S) : David A. Hain et al.

It is certified that error appears in the above—identified patent and that said Letters Patent is hereby corrected as shown below:

Column 6, line 1, after "currency" insert --cassette--.

Column 6, line 13, delete "sensin9" and substitute --sensing--.

Column 6, line 31, after "insertion" insert --is--.

Column 7, line 3, delete "contorl" and substitute --control--.

Column 7, line 9, after "as" insert --to--.

Column 7, line 14, delete "ss" and substitute --as--.

Column 8, line 12, after "of" insert --said--.

Signed and Sealed this

Thirteenth Day of October, 1987

Attest:

DONALD J. QUIGG

*Attesting Officer*     *Commissioner of Patents and Trademarks*